(12) United States Patent
Jiao

(10) Patent No.: US 10,805,231 B2
(45) Date of Patent: Oct. 13, 2020

(54) SERVICE PROCESSING METHOD AND SYSTEM AND DEVICE

(71) Applicant: Huawei Technologies Co., Ltd., Shenzhen (CN)

(72) Inventor: Jianbing Jiao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 667 days.

(21) Appl. No.: 15/140,755

(22) Filed: Apr. 28, 2016

(65) Prior Publication Data

US 2016/0241486 A1 Aug. 18, 2016

Related U.S. Application Data

(63) Continuation of application No. PCT/CN2014/089759, filed on Oct. 29, 2014.

(30) Foreign Application Priority Data

Oct. 29, 2013 (CN) .......................... 2013 1 0526368

(51) Int. Cl.
*H04L 12/911* (2013.01)
*H04L 12/24* (2006.01)
(Continued)

(52) U.S. Cl.
CPC ........ *H04L 47/781* (2013.01); *H04L 41/0668* (2013.01); *H04L 47/70* (2013.01);
(Continued)

(58) Field of Classification Search
CPC ... H04L 47/781; H04L 41/0668; H04L 41/70; H04L 67/10; H04L 67/1008; H04L 67/1012
(Continued)

(56) References Cited

U.S. PATENT DOCUMENTS 5,349,682 A * 9/1994 Rosenberry ........... G06F 9/3001
712/31
5,951,694 A * 9/1999 Choquier ................ G06F 9/505
709/203
(Continued)

FOREIGN PATENT DOCUMENTS

CN 1512380 A 7/2004
CN 102541640 * 12/2011
(Continued)

OTHER PUBLICATIONS

Foreign Communication From a Counterpart Application, European Application No. 14857547.5, Extended European Search Report dated Sep. 19, 2016, 8 pages.
(Continued)

*Primary Examiner* — James E Springer
*Assistant Examiner* — Patrick F Ngankam
(74) *Attorney, Agent, or Firm* — Conley Rose, P.C.

(57) ABSTRACT

A service processing method and system, and a device to reduce a large quantity of back end servers, and to simplify a structure of a distributed system where the method includes receiving, by a master device in a resource pool, a service processing request, determining, by the master device, a resource required by a service, determining, according to a remaining resource of each slave device in the resource pool, a slave device that satisfies the resource required by the service, and assigning, by the master device, the service to the corresponding slave device for processing, where the master device and the slave device are both video surveillance front end devices, and the master device determines a device that is in the front end devices and whose remaining resource satisfies a preset threshold as the slave device.

16 Claims, 4 Drawing Sheets

(51) Int. Cl.
*H04L 29/08* (2006.01)
*H04N 7/18* (2006.01)

(52) U.S. Cl.
CPC .......... *H04L 67/10* (2013.01); *H04L 67/1008* (2013.01); *H04L 67/1012* (2013.01); *H04N 7/18* (2013.01)

(58) Field of Classification Search
USPC ........................................................ 709/209
See application file for complete search history.

(56) References Cited

U.S. PATENT DOCUMENTS

| | | | |
|---|---|---|---|
| 2005/0060349 | A1 | 3/2005 | Shinn et al. |
| 2007/0226743 | A1 | 9/2007 | Takahashi |
| 2009/0259720 | A1* | 10/2009 | Heins ............... G06Q 10/10 709/205 |
| 2011/0010634 | A1 | 1/2011 | Hatasaki et al. |
| 2012/0149464 | A1* | 6/2012 | Bone ............... G06F 9/5044 463/30 |
| 2014/0043480 | A1 | 2/2014 | Wu |

FOREIGN PATENT DOCUMENTS

| | | | |
|---|---|---|---|
| CN | 102541640 | * | 7/2012 |
| CN | 102541640 A | | 7/2012 |
| CN | 102541640 A | * | 7/2012 |
| CN | 102638456 A | | 8/2012 |
| CN | 103248659 A | | 8/2013 |
| JP | 2001117887 A | | 4/2001 |
| JP | 2004302741 A | | 10/2004 |
| JP | 2005092880 A | | 4/2005 |
| JP | 2007264794 A | | 10/2007 |
| JP | 2011018198 A | | 1/2011 |
| KR | 20140052355 | * | 10/2012 |
| KR | 20130108609 A | | 10/2013 |
| WO | WO 2008127372 | * | 10/2007 |
| WO | WO-2008127372 A2 | * | 10/2008 .......... G06F 9/5027 |
| WO | 2012082589 A2 | | 6/2012 |
| WO | 2012142797 A1 | | 10/2012 |

OTHER PUBLICATIONS

Partial English Translation and Abstract of Chinese Patent Application No. CN102638456, Aug. 3, 2016, 21 pages.
Partial English Translation and Abstract of Chinese Patent Application No. CN102541640, Apr. 28, 2016, 5 pages.
Foreign Communication From a Counterpart Application, PCT Application No. PCT/CN2014/089759, English Translation of International Search Report dated Feb. 3, 2015, 2 pages.
Foreign Communication From a Counterpart Application, PCT Application No. PCT/CN2014/089759, English Translation of Written Opinion dated Feb. 3, 2015, 12 pages.
Foreign Communication From a Counterpart Application, Korean Application No. 10-2016-7013280, Korean Office Action dated Jan. 29, 2018, 5 pages.
Foreign Communication From a Counterpart Application, Korean Application No. 10-2016-7013280, English Translation of Korean Office Action dated Jan. 29, 2018, 3 pages.
Machine Translation and Abstract of Chinese Publication No. CN1512380, Jul. 14, 2004, 18 pages.
Foreign Communication From a Counterpart Application, Chinese Application No. 201310526368.7, Chinese Office Action dated Mar. 20, 2018, 9 pages.
Machine Translation and Abstract of Japanese Publication No. JP2004302741, Oct. 28, 2004, 41 pages.
Foreign Communication From a Counterpart Application, Japanese Application No. 2016-527181, Japanese Office Action dated Jul. 4, 2017, 2 pages.
Foreign Communication From a Counterpart Application, Japanese Application No. 2016-527181, English Translation of Japanese Office Action dated Jul. 4, 2017, 3 pages.

* cited by examiner

SERVICE PROCESSING METHOD AND SYSTEM AND DEVICE

CROSS-REFERENCE TO RELATED APPLICATIONS

This application is a continuation of International Application No. PCT/CN2014/089759, filed on Oct. 29, 2014, which claims priority to Chinese Patent Application No. 201310526368.7, filed on Oct. 29, 2013, both of which are hereby incorporated by reference in their entireties.

TECHNICAL FIELD

The present disclosure relates to the field of computer technologies, and in particular, to a service processing method and system, and a device.

BACKGROUND

In an existing distributed processing system, generally, there are multiple distributed devices disposed at a system front end.

Using a video surveillance system as an example, multiple Internet Protocol (IP) cameras (IPCs) are disposed at a system front end to perform video capture and send a video stream. Generally, these IPCs feature in a large quantity and distribution in physical space. In addition, each individual IPC has poor analysis and processing capabilities. Except completing its own video capture, simple processing, and stream sending, the individual IPC cannot independently complete a computation-intensive function, for example, complex intelligent analysis or transcoding. Therefore, a dedicated server needs to be disposed at a system back end to complete complex computation.

Generally, the server at the system back end completes the complex computation using a centralized or distributed intensive processing method in a server stacking manner and by means of high-intensity processing.

Existence of a large quantity of system back end servers results in a complicated structure of the entire processing system, and the entire system places pressure on users in aspects such as costs, space, and maintenance.

SUMMARY

Embodiments of the present disclosure provide a service processing method and system, and a device, which can reduce a large quantity of system back end servers, and simplify a structure of a distributed system.

To resolve the foregoing technical problem, the embodiments of the present disclosure disclose the following technical solutions.

According to a first aspect, a service processing method is provided and applied to a video surveillance system, and the method includes receiving, by a master device in a resource pool, a service processing request, determining, by the master device, a resource required by a service, and determining, according to a remaining resource of each slave device in the resource pool, a slave device that satisfies the resource required by the service, and assigning, by the master device, the service to the corresponding slave device for processing, where the master device and the slave device are both video surveillance front end devices, the master device determines a device that is in the front end devices and whose remaining resource satisfies a preset threshold as the slave device, and the master device and the slave device form the resource pool.

With reference to the foregoing first aspect, in a first possible implementation manner, that the master device determines a device that is in the front end devices and whose remaining resource satisfies a preset threshold as the slave device, and the master device and the slave device form the resource pool includes converting, by each front end device according to a preset remaining capability reference, a remaining resource of the front end device into a corresponding remaining processing capability value, and reporting the remaining processing capability value to the master device, determining, by the master device, a front end device whose remaining processing capability value satisfies a preset capability threshold as the slave device, and forming the resource pool using the master device and the slave device.

With reference to the foregoing first aspect, in a second possible implementation manner, determining, by the master device, a resource required by a service, and determining, according to a remaining resource of each slave device in the resource pool, a slave device that satisfies the resource required by the service includes dividing, by the master device according to various processing capabilities required by the service, the service into multiple sub-services, and assigning, according to a remaining processing capability of the slave device and a value of a corresponding processing capability that needs to be consumed for completing the multiple sub-services, a corresponding quantity of the slave devices to complete processing of the multiple sub-services.

With reference to the foregoing first aspect and the second possible implementation manner, in a third possible implementation manner, assigning, by the master device, the service to the corresponding slave device for processing includes sending, by the master device, a corresponding sub-service to each assigned slave device, sending, by the master device to a video storage module in the video surveillance system, a list of the assigned slave devices and an assignment correspondence between each of the slave devices in the list and the sub-service, receiving, by the master device, a processing result reported by each assigned slave device, where each assigned slave device sends a video data acquisition request to the video storage module in order to acquire a video stream required for processing the sub-service, perform corresponding video processing, and send the processing result to the master device, and summing up, by the master device, the processing result reported by each assigned slave device.

With reference to the foregoing first aspect and the first possible implementation manner, in a fourth possible implementation manner, the method further includes removing the slave device from the resource pool when the master device determines that each remaining processing capability value of the slave device is lower than the preset capability threshold.

With reference to the foregoing first aspect and the first to the fourth possible implementation manners, in a fifth possible implementation manner, the method further includes re-selecting an idle slave device from the slave devices and using the selected slave device as a master device when the master device is faulty.

According to a second aspect, a service processing system is provided and applied to a video surveillance system, and the system includes a master device and a slave device, where the master device and the slave device form a resource pool, where the master device and the slave device are both video surveillance front end devices, and the master device determines a device that is in the front end devices and whose remaining resource satisfies a preset threshold as the slave device, and the master device is configured to receive a service processing request, determine a resource required by a service, and determine, according to a remaining resource of each slave device in the resource pool, a slave device that satisfies the resource required by the service, and assign the service to the corresponding slave device for processing.

With reference to the foregoing second aspect, in a first possible implementation manner, an implementation manner in which the master device determines a device that is in the front end devices and whose remaining resource satisfies a preset threshold as the slave device includes converting, by each front end device according to a preset remaining capability reference, a remaining resource of the front end device into a corresponding remaining processing capability value, and reporting the remaining processing capability value to the master device, determining, by the master device, a front end device whose remaining processing capability value satisfies a preset capability threshold as the slave device, and forming the resource pool using the master device and the slave device.

With reference to the foregoing second aspect, in a second possible implementation manner, an implementation manner in which the master device determines a resource required by a service, and determines, according to a remaining resource of each slave device in the resource pool, a slave device that satisfies the resource required by the service includes dividing, by the master device according to various processing capabilities required by the service, the service into multiple sub-services, and assigning, according to a remaining processing capability of the slave device and a value of a corresponding processing capability that needs to be consumed for completing the multiple sub-services, a corresponding quantity of the slave devices to complete processing of the multiple sub-services.

With reference to the foregoing second aspect and the first possible implementation manner, in a third possible implementation manner, an implementation manner in which the master device assigns the service to the corresponding slave device for processing includes sending, by the master device, a corresponding sub-service to each assigned slave device, sending, by the master device to a video storage module in the video surveillance system, a list of the assigned slave devices and an assignment correspondence between each of the slave devices in the list and the sub-service, receiving, by the master device, a processing result reported by each assigned slave device, where each assigned slave device sends a video data acquisition request to the video storage module in order to acquire a video stream required for processing the sub-service, perform corresponding video processing, and send the processing result to the master device, and summing up, by the master device, the processing result reported by each assigned slave device.

With reference to the foregoing second aspect and the first possible implementation manner, in a fourth possible implementation manner, the master device is further configured to remove the slave device from the resource pool when it is determined that each remaining processing capability value of the slave device is lower than the preset capability threshold.

With reference to the foregoing second aspect and the first to the fourth possible implementation manners, in a fifth possible implementation manner an idle slave device is re-selected from the slave devices and is used as a master device when the master device is faulty.

According to a third aspect, a video surveillance front end device is provided and applied to a video surveillance system, and the device includes a video capture unit configured to capture video data, a receiving unit configured to receive a service processing request when the video surveillance front end device is a master device, and receive a service assigned by the master device when the video surveillance front end device is a slave device, a remaining resource feedback unit configured to send a remaining resource of the video surveillance front end device to the master device, a slave device determining unit configured to determine a device that is in front end devices and whose remaining resource satisfies a preset threshold as the slave device when the video surveillance front end device is the master device, and a processing unit configured to when the video surveillance front end device is the master device, determine, according to the service processing request, a resource required by the service, determine, according to a remaining resource of each slave device in a resource pool, a slave device that satisfies the resource required by the service, and assign the service to the corresponding slave device for processing, and process the service assigned by the master device when the video surveillance front end device is the slave device, where the master device is a video surveillance front end device, and the master device and the slave device form the resource pool.

With reference to the foregoing third aspect, in a first possible implementation manner, a specific implementation manner of the remaining resource feedback unit is converting, according to a preset remaining capability reference, a remaining resource of the video surveillance front end device into a corresponding remaining processing capability value, and reporting the remaining processing capability value to the slave device determining unit of the master device, and the slave device determining unit of the master device is configured to determine a front end device whose remaining processing capability value satisfies a preset capability threshold as the slave device.

With reference to the foregoing third aspect, in a second possible implementation manner, when the video surveillance front end device is the master device, a specific implementation manner of the processing unit includes dividing, according to various processing capabilities required by the service, the service into multiple sub-services, and assigning, according to a remaining processing capability of the slave device and a value of a corresponding processing capability that needs to be consumed for completing the multiple sub-services, a corresponding quantity of the slave devices to complete processing of the multiple sub-services, sending a corresponding sub-service to each assigned slave device, sending, to a video storage module in the video surveillance system, a list of the assigned slave devices and an assignment correspondence between each of the slave devices in the list and the sub-service, receiving a processing result reported by each assigned slave device, where each assigned slave device sends a video data acquisition request to the video storage module in order to acquire a video stream required for processing the sub-service, perform corresponding video processing, and send the processing result to the master device, and summing up the processing result reported by each assigned slave device.

With reference to the foregoing third aspect and the first possible implementation manner, in a third possible implementation manner, when the video surveillance front end device is the master device, the processing unit is further configured to remove the slave device from the resource pool when it is determined that each remaining processing capability value of the slave device is lower than the preset capability threshold.

With reference to the foregoing third aspect and the first to the third possible implementation manners, in a fourth possible implementation manner, when the video surveillance front end device is the master device, the processing unit is further configured to re-select an idle slave device from the slave devices and use the selected slave device as a master device when the master device is faulty.

According to the embodiments of the present disclosure, a master device is determined from front end devices of a distributed system, the master device determines a device that is in the front end devices and whose remaining resource satisfies a preset threshold as a slave device, and then the master device and the slave device form a resource pool, when receiving a service processing request, the master device may determine, according to a resource required by a service and a remaining resource of each slave device in the resource pool, a slave device that satisfies the resource required by the service such that the master device assigns the service to the corresponding slave device for processing. It can be seen that a remaining resource of the front end device may be fully utilized by setting the resource pool, and the slave device uses the remaining resource to perform a service processing operation. In this way, a system back end server for performing a service operation does not need to be disposed separately, and a structure of the distributed system can be simplified because disposal of a system back end server is canceled.

BRIEF DESCRIPTION OF DRAWINGS

To describe the technical solutions in the embodiments of the present disclosure more clearly, the following briefly introduces the accompanying drawings required for describing the embodiments or the prior art. A person of ordinary skill in the art may still derive other drawings from these accompanying drawings without creative efforts.

DESCRIPTION OF EMBODIMENTS

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

First, a service processing method according to the present disclosure is introduced.

Figure 1:
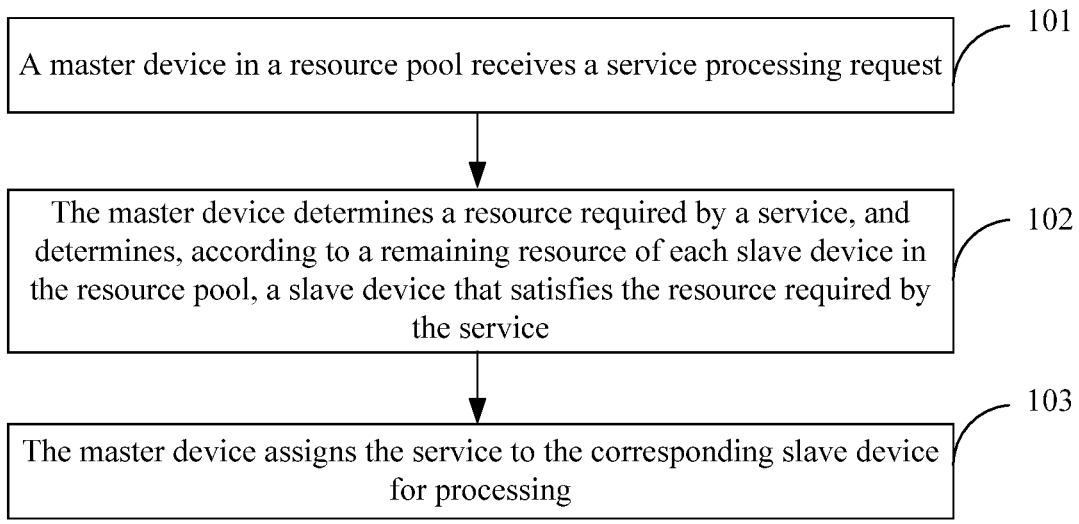
FIG. 1 is a flowchart of an embodiment of a service processing method according to the present disclosure.

Refer to FIG. 1, FIG. 1 shows a process of an embodiment of the service processing method provided in the present disclosure, where the service processing method is applied to a video surveillance system, and the service processing process may include the following steps.

Step 101: A master device in a resource pool receives a service processing request.

In the prior art, multiple front end devices are generally disposed at a front end of a distributed system, where the front end devices are connected to a client, and are used to receive a service processing request initiated by a user and perform simple data processing. Complex analysis and calculation processes are completed by a back-end dedicated server connected to the front end devices.

However, it is found, by means of research, that in a practical application scenario, there are still remaining resources that can be used after front end devices perform simple data processing, but these remaining resources of the front end devices are not used and are wasted actually.

The video surveillance system is used as an example. When a front end IPC runs normally, central processing unit (CPU) usage ranges from 10% to 30%, free memory is usually within 100 megabyte (MB), a network bandwidth utilization rate is less than 10%, and generally 50% of audio-video coding and decoding resources are used. At a CPU usage limit of 70%, the bandwidth utilization rate is 80%, 100% of encoding and decoding resources are used, and free memory is about 10 MB. It can be seen that each front end device has substantial idle resources that can be utilized.

In this embodiment of the present disclosure, the remaining resources of the front end devices in the distributed system are fully used, using these remaining resources to perform service processing can reduce system back end servers. Furthermore, a device is selected from the front end devices and used as a master device, the master device determines a device that is in the front end devices and whose remaining resource satisfies a preset threshold as a slave device, and the master device and the slave device form a resource pool.

When service processing needs to be performed, the user initiates a service processing request to the master device.

Step 102: The master device determines a resource required by a service, and determines, according to a remaining resource of each slave device in the resource pool, a slave device that satisfies the resource required by the service.

In this step, after receiving the service processing request, the master device needs to determine a resource required for a service processing process, and then determines, according to a remaining resource situation of each slave device in the resource pool, the slave device that satisfies a resource requirement in order to perform service processing until a sum of remaining resources of the determined slave devices satisfies the resource required for the service processing process.

Step 103: The master device assigns the service to the corresponding slave device for processing.

In this step, after determining the slave device for performing service processing, the master device may assign the service to the corresponding slave device such that the corresponding slave device performs a specific service processing operation.

According to this embodiment of the present disclosure, a master device is determined from front end devices of a distributed system, the master device determines a device that is in the front end devices and whose remaining resource satisfies a preset threshold as a slave device, and then the master device and the slave device form a resource pool. When receiving a service processing request, the master device may determine, according to a resource required by a service and a remaining resource of each slave device in the resource pool, a slave device that satisfies the resource required by the service such that the master device assigns the service to the corresponding slave device for processing. It can be seen that a remaining resource of the front end device may be fully utilized by setting the resource pool, and the slave device uses the remaining resource to perform a service processing operation. In this way, a system back end server for performing a service operation does not need to be disposed separately, and a structure of the distributed system can be simplified because disposal of a system back end server is canceled.

Figure 2:
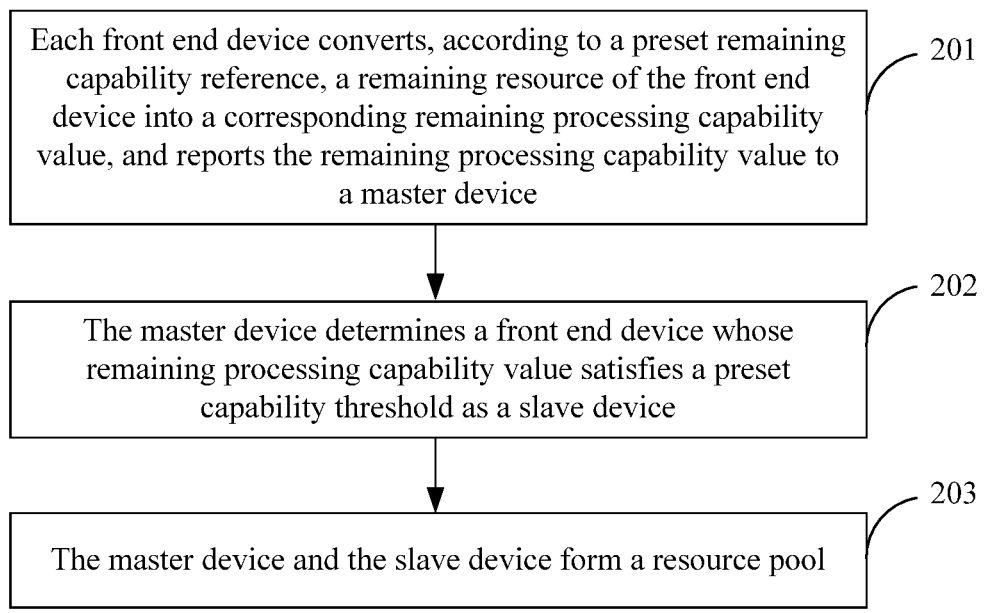
FIG. 2 is a flowchart of implementation of forming a resource pool according to the present disclosure.

It should be noted that, in this embodiment of the present disclosure, a specific implementation manner in which the master device determines a device that is in the front end devices and whose remaining resource satisfies a preset threshold as a slave device, and the master device and the slave device form a resource pool may be shown in FIG. 2 and include the following steps.

Step 201: Each front end device converts, according to a preset remaining capability reference, a remaining resource of the front end device into a corresponding remaining processing capability value, and reports the remaining processing capability value to the master device.

Step 202: The master device determines a front end device whose remaining processing capability value satisfies a preset capability threshold as the slave device.

Step 203: The master device and the slave device form the resource pool.

In this implementation manner, all the front end devices except the master device need to report their own remaining resource situations to the master device. Furthermore, each front end device may convert, according to its own preset remaining capability reference, its own remaining resource into a corresponding remaining processing capability value, where the corresponding remaining capability value is used to indicate a value of a corresponding capability, and report the remaining processing capability value to the master device. The master device compares remaining processing capability data, of each front end device, reported by each front end device and the preset capability threshold, determines the front end device whose remaining processing capability value satisfies the preset capability threshold as the slave device, and adds the slave device to the resource pool.

The video surveillance system is used as an example. In addition to common management software for video surveillance, distributed processing management software is also deployed on the IPC, and software (defined as an agent module) that can collect and report resources of the local device is installed. A master device (master) may be selected from each IPC cluster, and the master device is used to collect statistics on a remaining resource of each IPC. The master device may also be a device instead of an IPC, and it only needs to install a statistics and analysis module in the device.

Resource management adopts a master-slave manner. The agent is responsible for collecting remaining resource information of the local device, and reporting to the master. The master centrally manages all IPCs and is responsible for adding an IPC to and removing an IPC from the resource pool, and assigning a service.

An agent of each IPC converts, according to a customized remaining capability reference, a remaining computation capability $C_i$ of the IPC into a remaining computation capability value, and similarly, converts a remaining memory capability into a value Mo, converts a remaining network bandwidth processing capability into a value Wp, converts a remaining encoding capability into a value Bj, converts a remaining decoding capability into a value Dk, converts a remaining encryption capability into a value El, converts a remaining decryption capability into a value DEm, and converts a remaining storage capability into a value Sq. Then these capability data is sent to the master in a message.

The master performs modeling according to a resource distribution situation of each IPC device, and separately lists a situation of each resource of each IPC device, for example, a computing resource, an encoding and decoding resource, a storage resource, and an encryption and decryption resource in order to facilitate management.

The master determines, by comparing calculated remaining usable capabilities of each service device and each preset capability threshold, whether to add the IPC to the resource pool. A rule is if the remaining usable capabilities are higher than the capability thresholds, the IPC may be added to the resource pool. Furthermore, it may be set that once one capability threshold is satisfied, the IPC may be added to the resource pool. However, if all remaining usable capabilities are lower than the corresponding capability thresholds, the IPC is not allowed to be added to the resource pool.

Each capability threshold may use a set of test empirical values by default, or some typical values may be provided, for configuration in different scenarios. It can be set that an IPC sends a message to the master at a fixed interval to report a remaining resource situation of the service device. If the master receives no message from a service device, the master may remove the IPC from the resource pool.

The following lists some feasible manners for calculating a remaining processing capability.

(1) Remaining computation capability (measured using one item in benchmark standards): (1−CPU %)*benchmark (2) Remaining encoding and decoding capability: Quantity of Codec frames (total)−Quantity of Codec frames (used)

(3) Remaining encryption and decryption capability: Quantity of Encrypt frames (total)−Quantity of Encrypt frames (used)

(4) Remaining storage capability: Quantity of storage capability frames (total)−Quantity of storage capability frames (used)

(5) Remaining network bandwidth processing capability: Bandwidth (total)−Bandwidth (used)

(6) Remaining memory capability: Memory (total)−Memory (used)

A capability set layer is disposed in the master device to classify remaining physical resources into logical capability resources, and may include a remaining computation capability set, a remaining encoding and decoding capability set, a remaining encryption and decryption capability set, a remaining storage capability set, a remaining network bandwidth capability set, a remaining memory capability set, and the like. The capability set layer gathers corresponding remaining capability values converted from various remaining capability information of multiple IPCs.

Using the remaining computation capability as an example, remaining computation capability data obtained by means of summation based on multiple IPCs is shown in the following formula:

$$Nc = \sum_{i=1}^{n} c_i/ca, \qquad (1)$$

Nc is a computation remaining capability value obtained by serializing a remaining computation capability of each of n IPCs, ca is a reference (using a computation capability consumed for processing a single frame as the reference) of the capability, and ci is a remaining computation capability value reported by each IPC.

According to different services, a value of each capability set that needs to be consumed by the services is analyzed, and a calculation formula is as follows:

$$R=i*Ca+j*Ba+K*Da+1*Ea+m*DEa+n*Sa+p*Ma+q*Wa, \qquad (2)$$

Each of Ca, Ba, Da, Ea, DEa, Sa, Ma, and Wa is a remaining capability reference value of each capability. Coefficients before the values may be 0, which indicates that a capability is not used. A nominal value of each capability required by the services may be obtained by deduction according to the formula.

In addition, a service capability of the resource pool is shown in the following formula:

$$Pn=\min(Nc/i, Nb/j, Nd/k \ldots), \qquad (3)$$

Nc, Nb, Nd ... are total capability values of the resource pool after serialization, i, j, k ... are quantities of all corresponding capabilities that need to be consumed for completing a service, Pn is a processing capability for each service. In this way, a quantity of videos that can be processed in the resource pool for each service can be obtained.

Further, the master device divides, according to various processing capabilities required by the service, the service into multiple sub-services, and assigns, according to the remaining processing capability of the slave device and a value of a corresponding processing capability that needs to be consumed for completing the multiple sub-services, a corresponding quantity of the slave devices to complete processing of the multiple sub-services.

Furthermore, the master device sends a corresponding sub-service to each assigned slave device. The master device sends, to a video storage module in the video surveillance system, a list of the assigned slave devices and an assignment correspondence between each of the slave devices in the list and the sub-service. The master device receives a processing result reported by each assigned slave device, where each assigned slave device sends a video data acquisition request to the video storage module in order to acquire a video stream required for processing the sub-service, perform corresponding video processing, and send the processing result to the master device, and finally, the master device sums up the processing result reported by each assigned slave device.

It should be noted that the master device is mainly used to schedule a resource, and there may be multiple manners of determining the master device. For example, a device that starts first is used as the master device, and this device performs resource scheduling for a device that is subsequently added to the resource pool.

In a running process, if the master device is suspended due to an exception or the like, one of idle slave devices in the resource pool may be re-elected to be a master device in a manner of election. There are multiple election manners, which is not limited in this embodiment of the present disclosure. A person skilled in the art may perform specific setting according to a practical application scenario. For example, a device having a highest CPU capability is elected to be a master device.

In addition, a device backup may be performed for the master device, including a hot backup or a cold backup. A quantity of backups of the master device may be configured by the user. When a hot backup is performed, data is backed up synchronously. When a cold backup is performed, if the master device stops working due to damage or another reason, a cold backup device broadcasts a command to each slave device to acquire resource information and manage resources.

In a specific application scenario, to avoid a case in which a storage capacity of the resource pool is insufficient, a storage device may be set to connect to the IPC devices in the resource pool, and the storage device may be directly added to the resource pool, or may be disposed outside the resource pool.

To facilitate understanding of the technical solution of the present disclosure, the following describes in detail the technical solution of the present disclosure using a specific application scenario.

Figure 3:
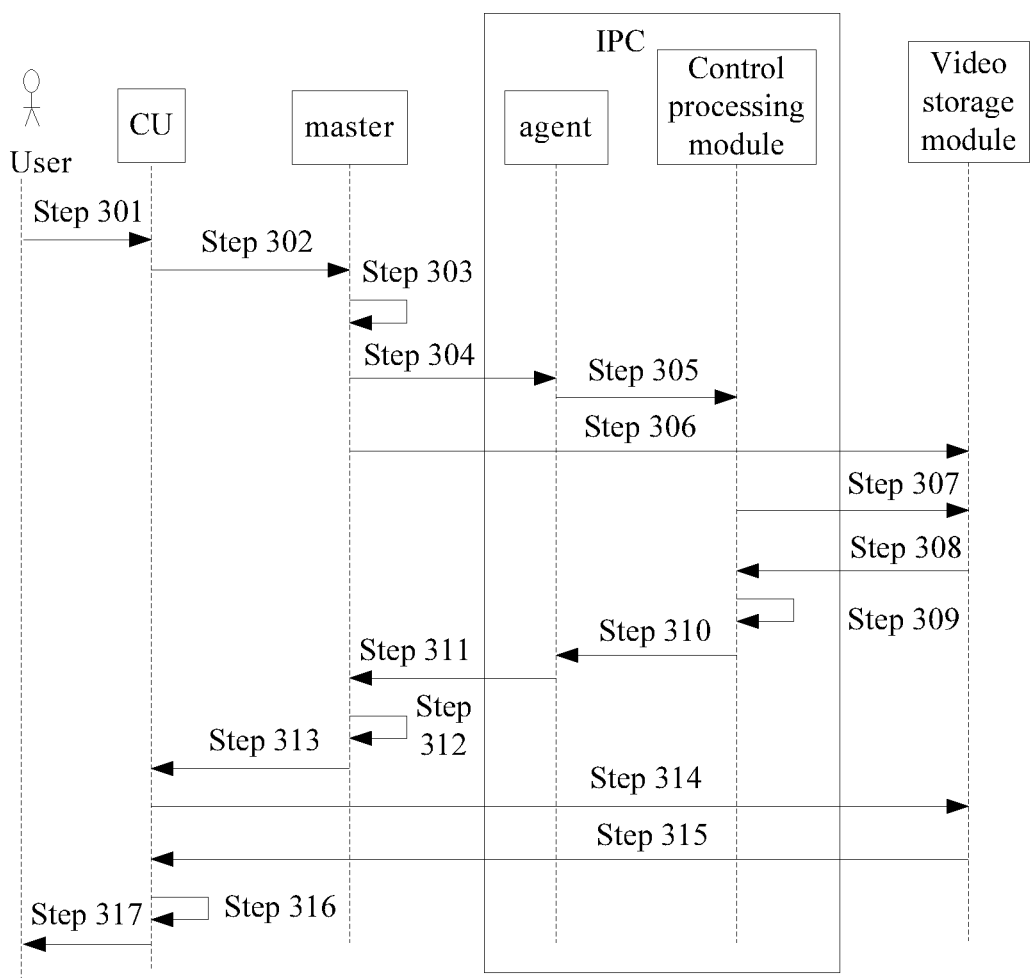
FIG. 3 is a schematic flowchart for processing in an IPC tripwire detection according to the present disclosure.

A first application scenario is IPC tripwire detection. A specific processing process is shown in FIG. 3 and may include the following steps.

Step 301: A user starts a tripwire detection process using a client unit (CU).

Step 302: The CU delivers a tripwire detection service to a master device (master) in a resource pool.

Step 303: The master analyzes a size and a type of the service, and calculates and schedules a corresponding quantity of slave devices.

Furthermore, the master may divide, according to various processing capabilities required by the service, the service into multiple sub-services, and then assign, according to a remaining processing capability of the slave device and a value of each corresponding capability that needs to be consumed for completing the service, a slave device that can complete processing of each sub-service, and then assign a corresponding sub-service to a slave device that executes the sub-service, where the corresponding capabilities include a remaining computation capability, a remaining encoding and decoding capability, a remaining encryption and decryption capability, a remaining storage capability, a remaining network bandwidth capability, a remaining memory capability, and the like.

Step 304: The master sends a corresponding sub-service to an agent in a corresponding slave device.

A slave device that satisfies a resource requirement is assigned in order of sequence numbers in a resource list that is reported by each agent and maintained by the master, until a sum of resources of the assigned slave devices satisfies a sum of all resources, and the slave devices are correspondingly deducted from a list of slave devices for subsequent service assignment.

Step 305: The agent that receives the sub-service sends, to a control processing module (referred to as control herein) in an IPC, the sub-service that needs to be processed by the module.

Step 306: The master reports, to a video storage module, a list of the slave devices that execute the service and an assignment correspondence between each of the slave devices in the list and a sub-service such that the IPC accesses the video storage module and acquires required video data.

Step 307: The IPC sends, using the control processing module, a video data acquisition request to the video storage module in order to acquire a video stream required for processing the sub-service.

Step 308: The video storage module sends a corresponding video stream to the control processing module of the IPC.

Furthermore, the control may deliver a video stream to a corresponding IPC by time period.

Step 309: The control processing module receives the video stream, and performs video processing.

Step 310: The control processing module sends a processing result (including alarm information, an analysis result, and the like) to the agent.

Step 311: The agent reports the processing result of the IPC to the master.

Step 312: The master sums up a processing result reported by each IPC.

The master may retain a sequence of the processing results according to a video time period sequence carried in the processing results.

Step 313: The master reports summary information to the CU.

Step 314: When the user views the tripwire detection using the CU, a video steam acquisition request is sent to the video storage module.

Step 315: The video storage module sends a requested video stream to the CU.

Step 316: The CU acquires the video stream, and performs image assembly using the video stream and alarm data such as a trail reported by the master.

Step 317: The CU displays an assembly result.

In the foregoing execution process, according to a quantity of videos that can be processed in the resource pool for each service, namely, Pn, a provided stream in which a quantity of videos is lower than Pn may be processed in this resource pool. When an IPC is removed from the resource pool, the master device is responsible for scheduling another IPC and instructing the video storage module to re-send a video stream to a newly added IPC. To avoid interruption that occurs when the video stream is being received, a real-time stream needs to be temporarily stored in the memory for a real-time video resource, and duration may be notified of by the master device, which is usually maximum duration of the resource. Therefore, to send, to a newly added IPC, a video stream part that has been sent, this part of data may be sent from a memory buffer.

Figure 4:
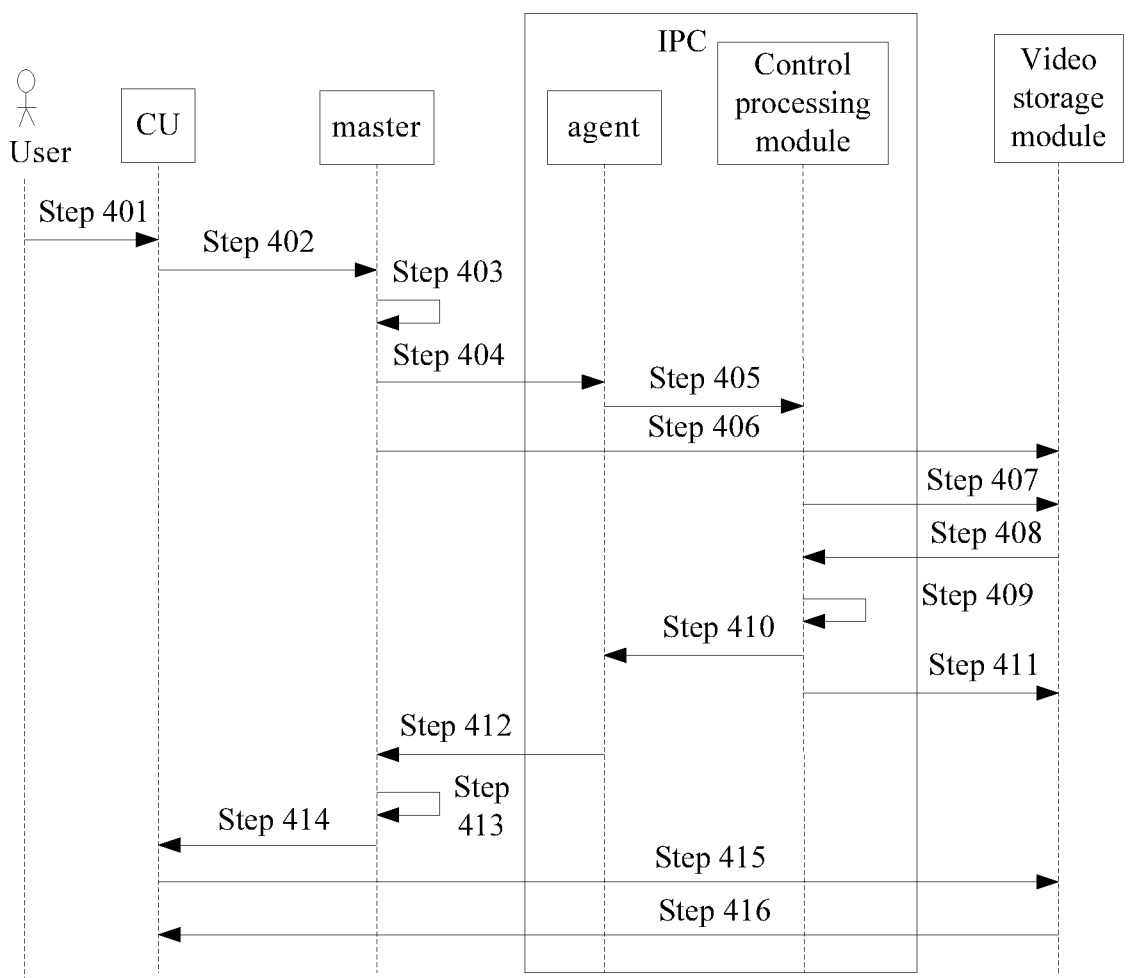
FIG. 4 is a schematic flowchart for a processing process of video digest analysis performed using an IPC according to the present disclosure.

Another application scenario is a video digest analysis using an IPC. A specific processing process is shown in FIG. 4 and may include the following steps.

Step 401: A user starts a video digest analysis process using a CU.

Step 402: The CU delivers a video digest analysis service to a master in a resource pool.

Step 403: The master analyzes a size and a type of the service, and calculates and schedules a corresponding quantity of slave devices.

Similarly, the master may divide, according to various processing capabilities required by the service, the service into multiple sub-services, and then assign, according to a remaining processing capability of the slave device and a quantity of corresponding capabilities that need to be consumed for completing the service, a slave device that can complete processing of each sub-service, and then assign a corresponding sub-service to a slave device that executes the sub-service, where the corresponding capabilities include a remaining computation capability, a remaining encoding and decoding capability, a remaining encryption and decryption capability, a remaining storage capability, a remaining network bandwidth capability, a remaining memory capability, and the like.

Step 404: The master sends a corresponding sub-service to an agent in a corresponding slave device.

Step 405: The agent that receives the sub-service sends, to a control processing module in the IPC, the sub-service that needs to be processed by the module.

Step 406: The master reports, to a video storage module, a list of the slave devices that execute the service and an assignment correspondence between each of the slave devices in the list and the sub-service such that the IPC accesses the video storage module and acquires required video data.

Step 407: The IPC sends, using the control processing module, a video data acquisition request to the video storage module in order to acquire a video stream required by the sub-service.

Step 408: The video storage module sends a corresponding video stream to the control processing module of the IPC.

Step 409: The control processing module receives the video stream, and performs video digest analysis processing.

Step 410: The control processing module sends a video digest analysis result to the agent.

Step 411: The control processing module stores the video digest analysis result in the video storage module.

Step 412: The agent reports the video digest analysis result of the IPC to the master.

Step 413: The master sums up a video digest analysis result reported by each IPC.

Step 414: The master reports video digest summary information to the CU.

Step 415: When the user views a video digest using the CU, a video digest acquisition request is sent to the video storage module.

Step 416: The video storage module sends a requested video digest stream to the CU.

It can be seen that, in the foregoing application scenario, an IPC resource pool is set and IPCs are divided into a master device and slave devices in the resource pool. When receiving a service processing request, an IPC that serves as the master device may determine, according to a resource required by a service and a remaining resource of each IPC that serves as a slave device in the resource pool, a slave device that satisfies the resource required by the service such that the master device assigns the service to the corresponding slave device for processing. It may be seen that a remaining resource of the front end IPC device may be fully utilized by setting the resource pool, and the slave device IPC uses the remaining resource to perform a service processing operation. In this way, a system back end server for performing a service operation does not need to be disposed separately, and a structure of the distributed system can be simplified because disposal of a system back end server is canceled.

Corresponding to embodiments of a service processing method according to the present disclosure, the prevent disclosure further provides a service processing system that is applied to a video surveillance system.

Figure 5:
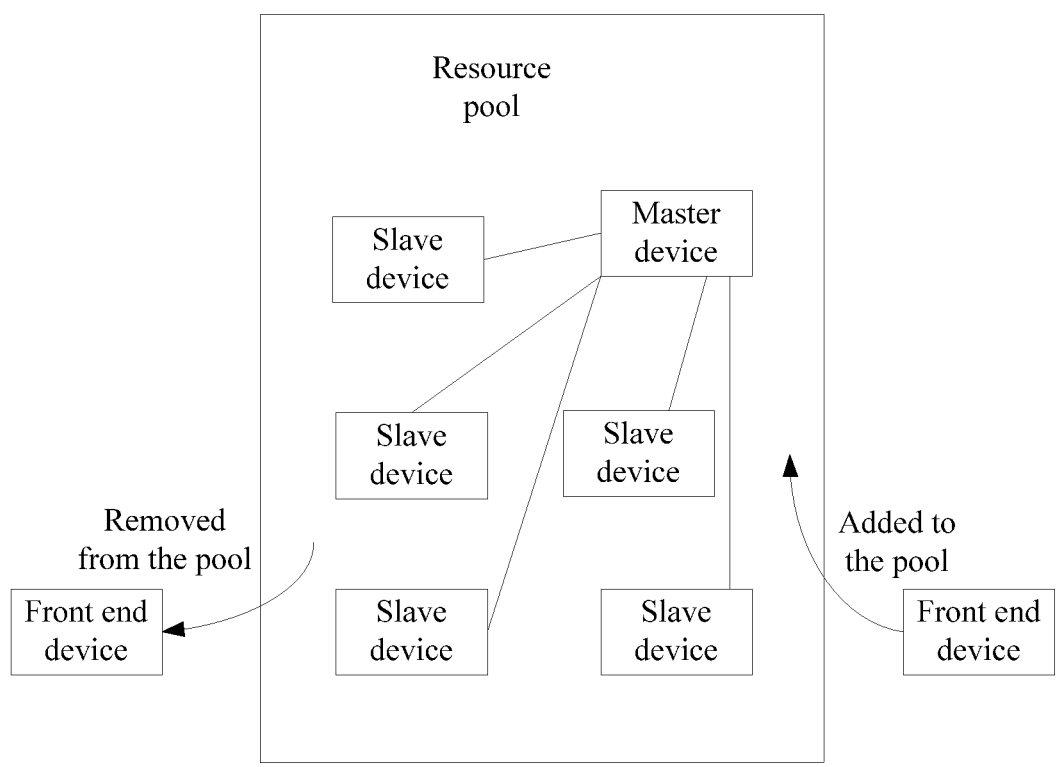
FIG. 5 is a schematic diagram of a structure of a service processing system according to the present disclosure.

FIG. 5 shows an embodiment of the service processing system according to the present disclosure, and the system may include a master device and a slave device, where the master device and the slave device form a resource pool, where the master device and the slave device are both video surveillance front end devices, and the master device determines a device that is in the front end devices and whose remaining resource satisfies a preset threshold as the slave device. The master device is configured to receive a service processing request, determine a resource required by a service, and determine, according to a remaining resource of each slave device in the resource pool, a slave device that satisfies the resource required by the service, and assign the service to the corresponding slave device for processing.

In this system embodiment of the present disclosure, a master device is determined from front end devices of a distributed system, the master device determines a device that is in the front end devices and whose remaining resource satisfies a preset threshold as a slave device, and then the master device and the slave device form a resource pool. When receiving a service processing request, the master device may determine, according to a resource required by a service and a remaining resource of each slave device in the resource pool, a slave device that satisfies the resource required by the service such that the master device assigns the service to the corresponding slave device for processing. It can be seen that a remaining resource of the front end device may be fully utilized by setting the resource pool, and the slave device uses the remaining resource to perform a service processing operation. In this way, a system back end server for performing a service operation does not need to be disposed separately, and a structure of the distributed system can be simplified because disposal of a system back end server is canceled.

In a specific implementation process, an implementation manner in which the master device determines a device that is in front end devices and whose remaining resource satisfies a preset threshold as the slave device includes converting, by each front end device according to a preset remaining capability reference, a remaining resource of the front end device into a corresponding remaining processing capability value, and reporting the remaining processing capability value to the master device, determining, by the master device, a front end device whose remaining processing capability value satisfies a preset capability threshold as the slave device, and forming the resource pool using the master device and the slave device.

In the foregoing implementation manner, all the front end devices except the master device need to report their own remaining resource situations to the master device. Furthermore, each front end device may convert, according to its own preset remaining capability reference, its own remaining resource into a corresponding remaining processing capability value, where the corresponding remaining capability value is used to indicate a value of a corresponding capability, and report the remaining processing capability value to the master device. The master device compares remaining processing capability data, of each front end device, reported by each front end device and the preset capability threshold, determines the front end device whose remaining processing capability value satisfies the preset capability threshold as the slave device, and adds the slave device to the resource pool.

Further, the master device divides, according to various processing capabilities required by the service, the service into multiple sub-services, and assigns, according to a remaining processing capability of the slave device and a value of a corresponding processing capability that needs to be consumed for completing the multiple sub-services, a corresponding quantity of the slave devices to complete processing of the multiple sub-services.

Then, the master device sends a corresponding sub-service to each assigned slave device. The master device sends, to a video storage module in the video surveillance system, a list of the assigned slave devices and an assignment correspondence between each of the slave devices in the list and the sub-service. The master device receives a processing result reported by each assigned slave device, where each assigned slave device sends a video data acquisition request to the video storage module in order to acquire a video stream required for processing the sub-service, perform corresponding video processing, and send the processing result to the master device, and finally, the master device sums up the processing result reported by each assigned slave device.

The video surveillance system is used as an example. When the video surveillance system uses the technical solution of the foregoing service processing system, in addition to common management software for video surveillance, distributed processing management software is also deployed on the IPC, and software (defined as an agent module) that can collect and report resources of the local device is installed. A master device may be selected from each IPC cluster, and the master device is used to collect statistics on a remaining resource of each IPC. The master device may also be an outside-domain device instead of the IPC, and it only needs to install a statistics and analysis module in the device.

Resource management adopts a master-slave manner. The agent is responsible for collecting remaining resource information of the local device, and reporting to the master. The master centrally manages all IPCs and is responsible for adding an IPC to and removing an IPC from the resource pool, assigning a service.

An agent of each IPC converts, according to a customized remaining capability reference, a remaining computation capability $C_i$ of the IPC into a remaining computation capability value, and similarly, converts a remaining memory capability into a value $M_o$, converts a remaining network bandwidth processing capability into a value $W_p$, converts a remaining encoding capability into a value $B_j$, converts a remaining decoding capability into a value $D_k$, converts a remaining encryption capability into a value $E_l$, converts a remaining decryption capability into a value $DE_m$, and converts a remaining storage capability into a value $S_q$. Then the capability data is sent to the master in a message.

The master performs modeling according to a resource distribution situation of each IPC device, and separately lists a situation of each resource of each IPC device, for example, a computing resource, an encoding and decoding resource, a storage resource, and an encryption and decryption resource in order to facilitate management.

The master determines, by comparing calculated remaining usable capabilities of each IPC and each preset capability threshold, whether to add the IPC to the resource pool. A rule is if the remaining usable capabilities are higher than the capability thresholds, the IPC may be added to the resource pool. Furthermore, it may be set that once one capability threshold is satisfied, the IPC may be added to the resource pool. However, if all remaining usable capabilities are lower than the corresponding capability thresholds, the IPC is not allowed to be added to the resource pool.

Each capability threshold may use a set of test empirical values by default, or some typical values may be provided, for configuration in different scenarios. It can be set that an IPC sends a message to the master at a fixed interval to report a remaining resource situation of the service device. If the master receives no message from a service device, the master may remove the IPC from the resource pool.

It should be noted that, the master device is mainly used to schedule a resource, and there may be multiple manners of determining the master device. For example, a device that starts first is used as the master device, and this device performs resource scheduling for a device that is subsequently added to the resource pool.

In a running process, if the master device is suspended due to an exception or the like, one of idle slave devices in the resource pool may be re-elected to be a master device in a manner of election. There are multiple election manners, which is not limited in this embodiment of the present disclosure. A person skilled in the art may perform specific setting according to a practical application scenario. For example, a device having a highest CPU capability the highest is elected to be a master device.

In addition, a device backup may be performed for the master device, including a hot backup or a cold backup. A quantity of backups of the master device may be configured by the user. When a hot backup is performed, data is backed up synchronously. When a cold backup is performed, if the master device stops working due to damage or another reason, a cold backup device broadcasts a command to each slave device to acquire resource information and manage resources.

This present disclosure further provides an embodiment of a video surveillance front end device that is applied to a video surveillance system, and the device may further include a video capture unit configured to capture video data, a receiving unit configured to receive a service processing request when the video surveillance front end device is a master device, and receive a service assigned by the master device when the video surveillance front end device is a slave device, a remaining resource feedback unit configured to send a remaining resource of the video surveillance front end device to the master device, a slave device determining unit configured to determine a device that is in front end devices and whose remaining resource satisfies a preset threshold as the slave device when the video surveillance front end device is the master device, and a processing unit configured to when the video surveillance front end device is the master device, determine, according to the service processing request, a resource required by the service, determine, according to a remaining resource of each slave device in a resource pool, a slave device that satisfies the resource required by the service, and assign the service to the corresponding slave device for processing, and when the video surveillance front end device is the slave device, process the service assigned by the master device, where the master device is a video surveillance front end device, and the master device and the slave device form the resource pool.

When the foregoing video surveillance front end device is applied, a master device is determined from front end devices, the master device determines a device that is in the front end devices and whose remaining resource satisfies a preset threshold as a slave device, and then the master device and the slave device form a resource pool. When receiving a service processing request, the master device may determine, according to a resource required by a service and a remaining resource of each slave device in the resource pool, a slave device that satisfies the resource required by the service such that the master device assigns the service to the corresponding slave device for processing. It can be seen that a remaining resource of the front end device may be fully utilized by setting the resource pool, and the slave device uses the remaining resource to perform a service processing operation. In this way, a system back end server for performing a service operation does not need to be disposed separately, and a structure of the distributed system can be simplified because disposal of a system back end server is canceled.

Furthermore, a specific implementation manner of the remaining resource feedback unit is converting, according to a preset remaining capability reference, a remaining resource of the video front end device into a corresponding remaining processing capability value, and reporting the remaining processing capability value to the slave device determining unit of the master device, and the slave device determining unit of the master device receives a remaining processing capability value reported by each video front end device, and is configured to determine a front end device whose remaining processing capability value satisfies a preset capability threshold as the slave device.

When the video surveillance front end device is the master device, a specific implementation manner of the processing unit includes dividing, according to various processing capabilities required by the service, the service into multiple sub-services, and assigning, according to a remaining processing capability of the slave device and a value of a corresponding processing capability that needs to be consumed for completing the multiple sub-services, a corresponding quantity of the slave devices to complete processing of the multiple sub-services, sending a corresponding sub-service to each assigned slave device, sending, to a video storage module in the video surveillance system, a list of the assigned slave devices and an assignment correspondence between each of the slave devices in the list and the sub-service, receiving a processing result reported by each assigned slave device, where each assigned slave device sends a video data acquisition request to the video storage module in order to acquire a video stream required for processing the sub-service, perform corresponding video processing, and send the processing result to the master device, and summing up the processing result reported by each assigned slave device.

In addition, when the video surveillance front end device is the master device, the processing unit is further configured to remove the slave device from the resource pool when it is determined that each remaining processing capability value of the slave device is lower than the preset capability threshold.

When the video surveillance front end device is the master device, the processing unit is further configured to re-select an idle slave device from the slave devices and use the selected slave device as a master device when the master device is faulty.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, device, and unit, reference may be made to a corresponding process in the foregoing method embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service processing method, applied to a video surveillance system, wherein the service processing method comprises:
   receiving, by a master device, a service processing request, wherein the master device is a video surveillance front end device of the video surveillance system, wherein the video surveillance system comprises the master device and multiple slave devices, and wherein the master device and the slave devices form a resource pool;
   determining, by the master device, resources required by a service;
   determining, by the master device according to remaining resources of each slave device in the resource pool, one of the slave devices that satisfies the resources required by the service, wherein the remaining resources comprise at least one of a computation resource, a memory resource, a network bandwidth resource, an encoding resource, a decoding resource, an encryption resource, a decryption resource, or a storage resource; and
   assigning, by the master device, the service to the one slave device for processing, wherein determining, by the master device, the resources required by the service, and determining, according to the remaining resources of each slave device in the resource pool, the one slave device that satisfies the resources required by the service comprises dividing, by the master device according to various processing capabilities required by the service, the service into multiple sub-services, and assigning, according to a remaining processing capability of the slave devices and a value of a corresponding processing capability that needs to be consumed for completing the multiple sub-services, a corresponding quantity of the slave devices to complete processing of the multiple sub-services, wherein each one of the multiple sub-services corresponds to a different one of the remaining resources and is assigned to a different one of the slave devices.

2. The service processing method of claim 1, wherein the service processing method further comprises determining, by the master device, a device that is in video surveillance front end devices and whose remaining resources satisfy a preset threshold as the slave device.

3. The service processing method of claim 2, further comprising removing the slave device from the resource pool when the master device determines that each remaining processing capability value of the slave device is lower than the preset threshold.

4. The service processing method of claim 1, wherein assigning, by the master device, the service to the one slave device for processing comprises:
   sending, by the master device, a corresponding sub-service to each assigned slave device;
   sending, by the master device to a video storage module in the video surveillance system, a list of the assigned slave devices and an assignment correspondence between each of the slave devices in the list and the sub-service;
   receiving, by the master device, a processing result reported by each assigned slave device, wherein each assigned slave device sends a video data acquisition request to the video storage module to acquire a video stream required for processing the sub-service, perform. corresponding video processing, and send the processing result to the master device; and
   summing up, by the master device, the processing result reported by each assigned slave device.

5. The service processing method of claim 1, wherein the computation resource is calculated as a product of one minus central processing unit percentage times a benchmark value.

6. The service processing method of claim 1, wherein the memory resource is calculated as a difference between a total memory and a used memory.

7. The service processing method of claim 1, wherein the network bandwidth resource is calculated as a difference between a total bandwidth and a used bandwidth.

8. The service processing method of claim 1, wherein the encoding resource and the decoding resource are calculated as a difference between a total quantity of codec frames and a used quantity of codec frames.

9. The service processing method of claim 1, wherein the encryption resource and the decryption resource comprise a difference between a total quantity of encrypted frames and a used quantity of encrypted frames.

10. The service processing method of claim 1, wherein the storage resource is calculated as a difference between a total quantity of storage capability frames and a used quantity of storage capability frames.

11. The service processing method of claim 1, wherein the computation resource is calculated as a product of one minus central processing unit percentage times a benchmark value, wherein the memory resource is calculated as a difference between a total memory and a used memory, wherein the network bandwidth resource is calculated as a difference between a total bandwidth and a used bandwidth, wherein the encoding resource and the decoding resource are calculated as a difference between a total quantity of codec frames and a used quantity of codec frames, wherein the encryption resource and the decryption resource comprise a difference between a total quantity of encrypted frames and a used quantity of encrypted frames, and wherein the storage resources is calculated as a difference between a total quantity of storage capability frames and a used quantity of storage capability frames.

12. A video surveillance system, comprising:
a master device; and
multiple slave devices,
wherein the master device and the slave devices form a resource pool of the video surveillance system,
wherein the master device is a video surveillance front end device of the video surveillance system,
wherein the master device comprises:
  a first video capture circuit configured to capture video data;
  a first receiver configured to receive a service processing request; and
  a first processor coupled to the first video capture circuit and the first receiver and configured to:
    determine, according to the service processing request, a resource required by the service;
    determine, according to remaining resources of each slave device in a resource pool, one of the slave devices that satisfies the resources required by the service, wherein the remaining resources comprise at least one of a computation resource, a memory resource, a network bandwidth resource, an encoding resource, a decoding resource, an encryption resource, a decryption resource, and a storage resource; and
    assign the service to the one slave device for processing, wherein the first processor is specifically configured to divide, according to various processing capabilities required by the service, the service into multiple sub-services, and assign, according to a remaining processing capability of the slave device and a value of a corresponding processing capability that needs to be consumed for completing the multiple sub-services, a corresponding quantity of the slave devices to complete processing of the multiple sub-services, wherein each one of the multiple sub-services corresponds to a different one of the remaining resources and is assigned to a different one of the slave devices; and
    send a corresponding sub-service to each assigned slave device; wherein the slave device comprises:
  a second video capture circuit configured to capture video data;
  a second receiver configured to receive a service assigned by a master device which is another video surveillance front end device;
  a second processor coupled to the second video capture circuit and the second receiver and configured to process the service assigned by the master device which is another video surveillance front end device; and
  a remaining resource feedback circuit coupled to the second processor and configured to send the remaining resources to the master device which is another video surveillance front end device.

13. he video surveillance system of claim 12, wherein the master device further comprises a slave device determining circuit coupled to the first processor, and wherein the remaining resource feedback circuit is further configured to:
  convert, according to a preset remaining capability reference, a remaining resource of the video surveillance front end device into a corresponding remaining processing capability value; and
  report the remaining processing capability value to the slave device determining circuit, wherein the slave device determining circuit is another video surveillance front end device, and wherein the slave device determining circuit is configured to determine a front end device whose remaining processing capability value satisfies a preset capability threshold as the slave device.

14. The video surveillance system of claim 13, wherein the first processor is further configured to remove the slave device from the resource pool when each remaining processing capability value of the slave device is lower than the preset capability threshold.

15. The video surveillance system of claim 12, wherein the first processor is further configured to:
  send, to a video storage module in the video surveillance system, a list of the assigned slave devices and an assignment correspondence between each of the slave devices in the list and the sub-service;
  receive a processing result reported by each assigned slave device, wherein each assigned slave device sends a video data acquisition request to the video storage module to acquire a video stream required for processing the sub-service, perform corresponding video processing, and send the processing result to the master device; and
  sum up the processing result reported by each assigned slave device.

16. The video surveillance system of claim 12, wherein the computation resource is calculated as a product of one minus central processing unit percentage times a benchmark value, wherein the memory resource is calculated as a difference between a total memory and a used memory, wherein the network bandwidth resource is calculated as a difference between a total bandwidth and a used bandwidth, wherein the encoding resource and the decoding resource are calculated as a difference between a total quantity of codec frames and a used quantity of codec frames, wherein the encryption resource and the decryption resource comprise a difference between a total quantity of encrypted frames and a used quantity of encrypted frames, and wherein the storage resources is calculated as a difference between a total quantity of storage capability frames and a used quantity of storage capability frames.

* * * * *